(12) United States Patent
Schütz (10) Patent No.: US 6,379,034 B1
(45) Date of Patent: Apr. 30, 2002

(54) DEVICE FOR EMPTYING TRANSPORT AND STORAGE CONTAINERS FOR LIQUIDS

(75) Inventor: Udo Schütz, Selters-Westerwald (DE)

(73) Assignee: Protechna S.A., Fribourg (CH)

( * ) Notice: Subject to any disclaimer, the term of this patent is extended or adjusted under 35 U.S.C. 154(b) by 0 days.

(21) Appl. No.: 09/566,199

(22) Filed: May 5, 2000

(30) Foreign Application Priority Data

May 5, 1999 (DE) .......................................... 299 07 967

(51) Int. Cl.[7] ................................................. B01F 7/22
(52) U.S. Cl. ........................ 366/185; 366/197; 366/207; 366/285; 366/286; 366/308; 414/408; 222/166
(58) Field of Search ........................... 222/166; 414/403, 414/404, 408, 406; 366/45–47, 185, 197, 207, 285, 286, 308, 331

(56) References Cited

U.S. PATENT DOCUMENTS

| | | | |
|---|---|---|---|
| 1,986,864 A | * | 1/1935 | Tolley |
| 2,133,474 A | * | 10/1938 | Roscoe |
| 3,193,150 A | * | 7/1965 | Simas |
| 3,279,633 A | * | 10/1966 | Evers |
| 3,912,061 A | * | 10/1975 | Foster, Jr. |
| 4,060,224 A | * | 11/1977 | Wilson |
| 4,431,597 A | * | 2/1984 | Cramer et al. |
| 4,684,259 A | * | 8/1987 | Rice et al. |
| 5,282,681 A | * | 2/1994 | Superlak |
| 5,490,603 A | | 2/1996 | Davis |

FOREIGN PATENT DOCUMENTS

| | | |
|---|---|---|
| DE | 3207437 | 9/1983 |
| DE | 296 20 791 U1 | 3/1997 |
| DE | 4414378 | 3/1999 |
| EP | 0242820 | 10/1987 |
| EP | 0780330 | 6/1997 |
| EP | 0857666 | 8/1998 |
| NL | 8802239 | 4/1990 |

* cited by examiner

Primary Examiner—Charles E. Cooley
Assistant Examiner—David Sorkin
(74) Attorney, Agent, or Firm—Friedrich Kueffner (57) ABSTRACT

A device for emptying a storage and transport container for liquids has a base frame, a pivot frame pivotably connected to the base frame, and a pivot drive connected to the pivot frame. The pivot frame has an initial low position and an upper pivot end position. The pivot drive can pivot the pivot frame from the initial low position into the upper pivot end position and from the upper pivot end position into the initial low position. The pivot frame receives the storage and transport container in the initial low position and secures the storage and transport container in the upper pivot end position. The upper pivot end position is the emptying position of the storage and transport container received on the pivot frame.

11 Claims, 7 Drawing Sheets

DEVICE FOR EMPTYING TRANSPORT AND STORAGE CONTAINERS FOR LIQUIDS

BACKGROUND OF THE INVENTION

1. Field of the Invention

The invention relates to a device for emptying transport and storage containers for liquids. The transport and storage containers are comprised of an inner container made of plastic material that is comprised of four sidewalls, a bottom wall, and a top wall with a closeable fill opening and a closeable discharge opening, an outer container made of sheet metal or a mesh and surrounding the inner container, and a pallet-like support frame.

2. Description of the Related Art

In a known transport and storage container disclosed in German patent document 44 14 378 C2 the bottom wall of the inner container is designed as a discharge bottom with a centrally arranged flat discharge channel which extends at a slight incline from the back wall of the container to a discharge socket with a discharge fitting arranged in the front wall of the inner container in the bottom area.

For discharge fittings such as a flap valve or a ball valve which are pressurized by liquid, the risk of leakage increases with increasing time of use. Upon repeated discharge of liquid from the container, it cannot be prevented that residual liquid drips from the fitting onto the floor if no catch basin is provided. The transport and the storage of liquids with a high degree of purity for industrial applications as well as of liquid foodstuffs such as juices and syrup in prior art containers having a discharge fitting in the bottom area presents problems because of the contamination risk resulting from lubricants such as silicone that may be required for the fitting and also from residues retained in the fitting which, upon repeated discharge of partial amounts from the liquid container, can be entrained in the liquid and cause contamination. Moreover, the complete emptying of the container via the discharge fitting provided at the front wall of the container in the bottom area is not optimal.

In order to avoid the aforementioned disadvantages of liquid containers with a discharge fitting in the bottom area, it has also been previously suggested to provide the discharge opening adjacent to the fill opening in the top wall of the container.

SUMMARY OF THE INVENTION

It is an object of the present invention to provide a constructively simple and inexpensive device for emptying transport and storage containers for liquids of the aforementioned kind which have a discharge opening arranged in the top wall of the container.

In accordance with the present invention, this is achieved in that the device has a base frame, a pivot frame pivotably mounted on the base frame for receiving a transport container for liquids, and a pivot drive for pivoting upwardly the pivot frame from an initial low position for receiving the transport container into an upper pivot end position in which the transport container is in its emptying position.

DESCRIPTION OF THE PREFERRED EMBODIMENTS

The emptying device 1 represented in FIGS. 1 through 7 is used for emptying transport and storage containers 2 for liquids. The transport and storage containers 2 are comprised of: an inner container 3 made of plastic, having four sidewalls 4 through 7, a bottom wall 8, and a top wall 9 with a fill opening 10, a discharge opening 11 and a vent opening 12 which are closeable; an outer container 13 embodied as a mesh or sheet metal mantle; and a pallet-like support frame 14.

The main components of the emptying device 1 are the following: a base frame 15; a pivot frame 16 pivotably mounted on the base frame 15 and designed for receiving a transport container 2 for liquids; a pivot drive 17 for pivoting upwardly the pivot frame 16 from an initial low position 16a with receiving position 2a of the transport container 2 into an upper pivot end positions 16b in which the transport container 2 is in its emptying position 2b; and a stirrer 18 mounted on the base frame 15. The base frame 15 of the emptying device 1 is comprised of a bottom frame 19, two forward upright supports 20, 21, and two sidewalls 22, 23 embodied as slanted lateral webs. The two lateral frame parts 24, 25 of the bottom frame 19 of the base frame 15 are embodied as hollow profiled members which form transport shoes for the gripping arms of a forklift.

Figure 2:
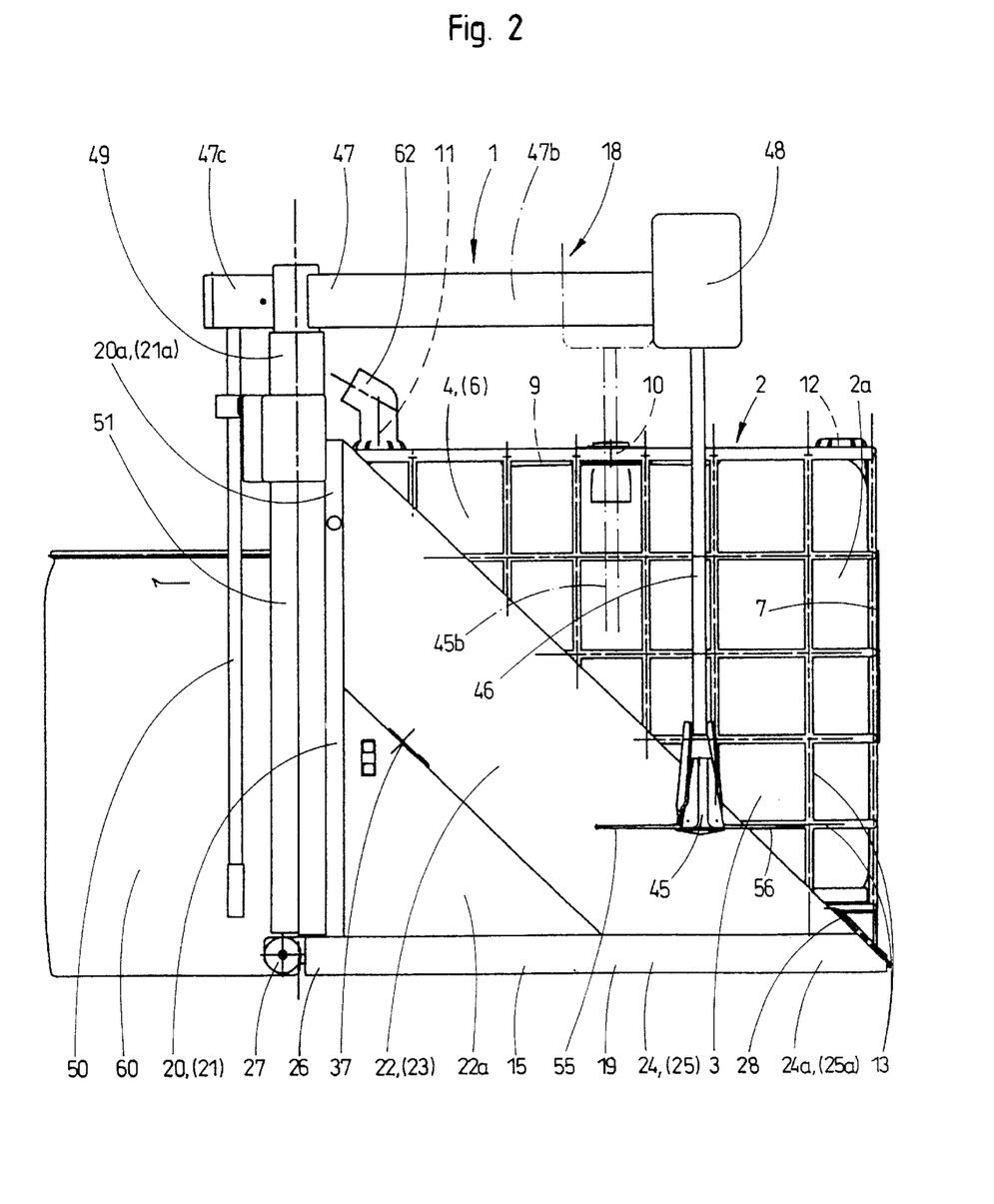
FIG. 2 is a side view of the emptying device according to the invention with a container to be emptied positioned therein.
Figure 3:
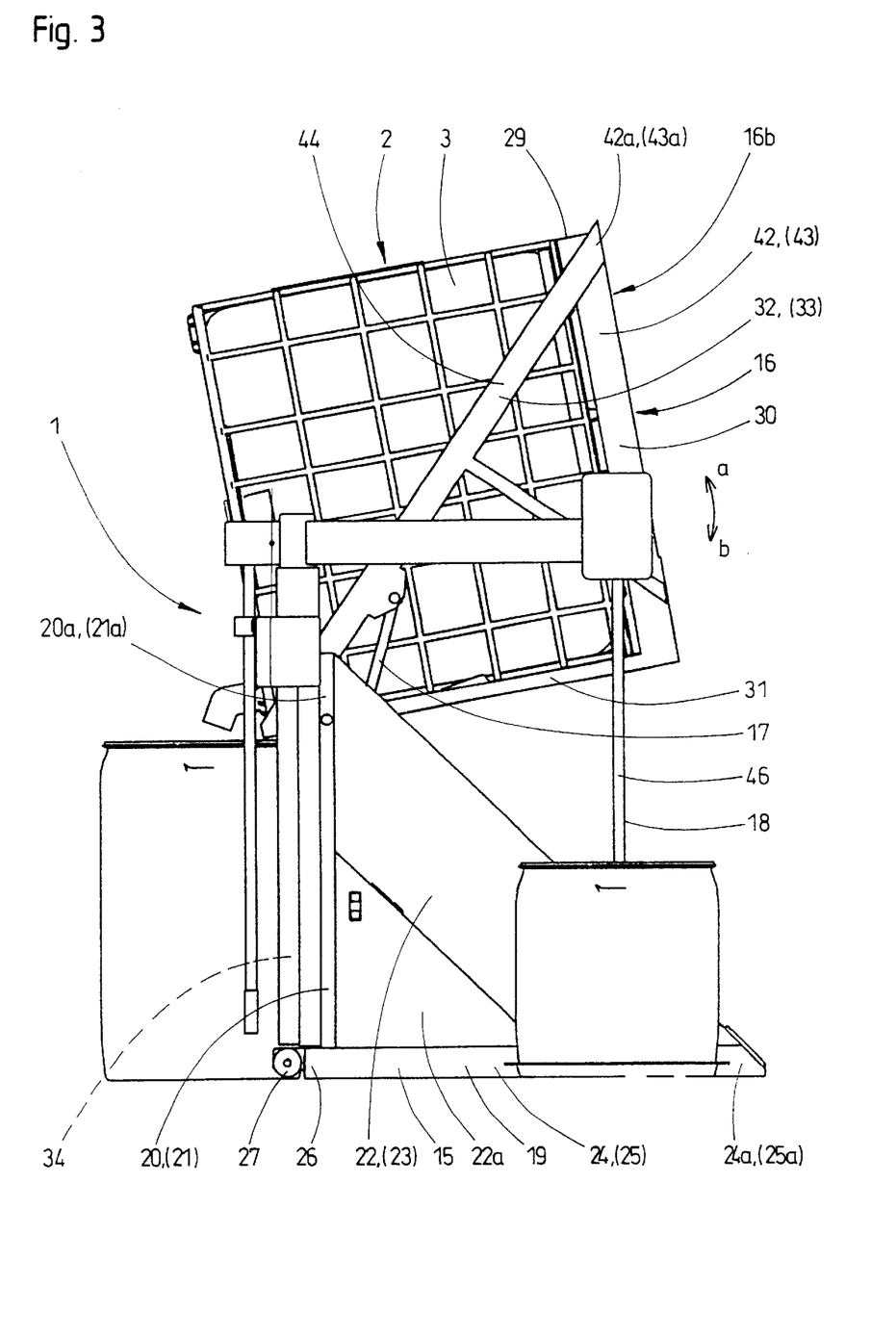
FIG. 3 is a side view of the emptying device according to the invention with a container pivoted upwardly into the emptying position.
Figure 4:
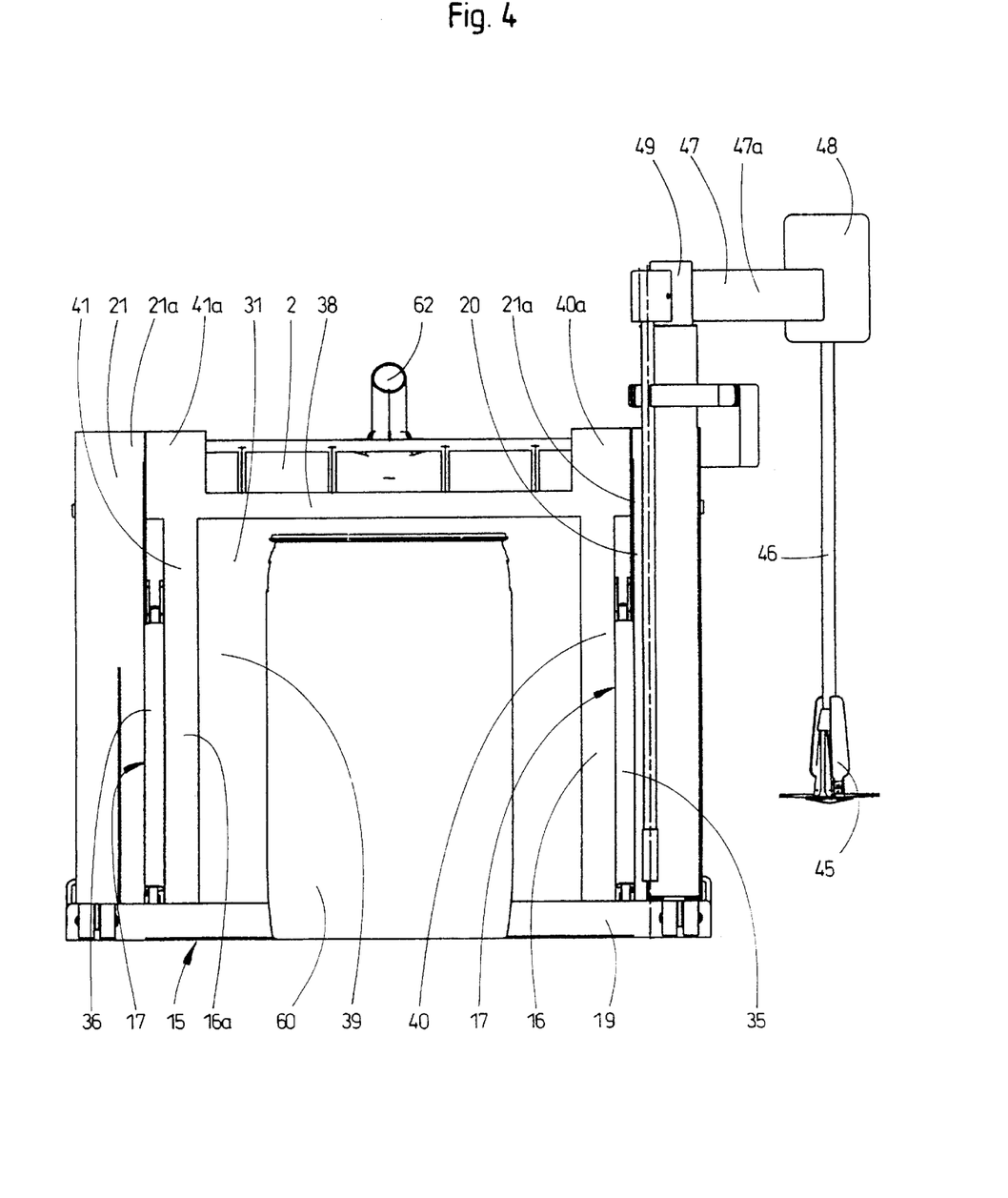
FIG. 4 is a front view of the emptying device according to the invention with a container to be emptied received therein.
Figure 5:
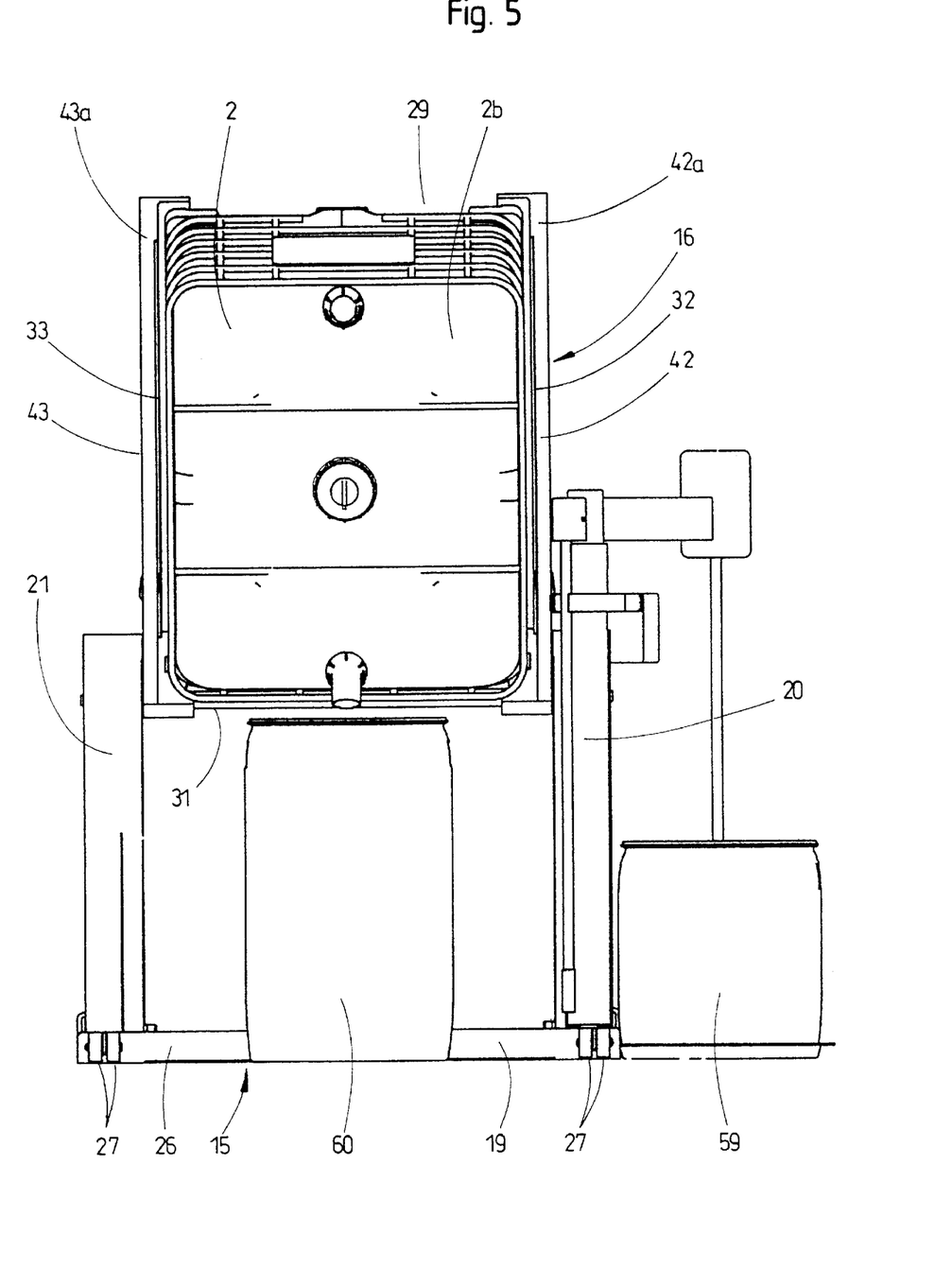
FIG. 5 is a front view of the emptying device according to the invention with a container pivoted upwardly into the emptying position.

Running wheels 27 are mounted on the forward frame end 26 of the bottom frame 19 of the base frame 15, and handles 28, for moving the emptying device 1 like a wheel barrow, are fastened on the rearward ends 24a, 25a of the two lateral frame parts 24, 25 of the bottom frame 19.

Figure 1:
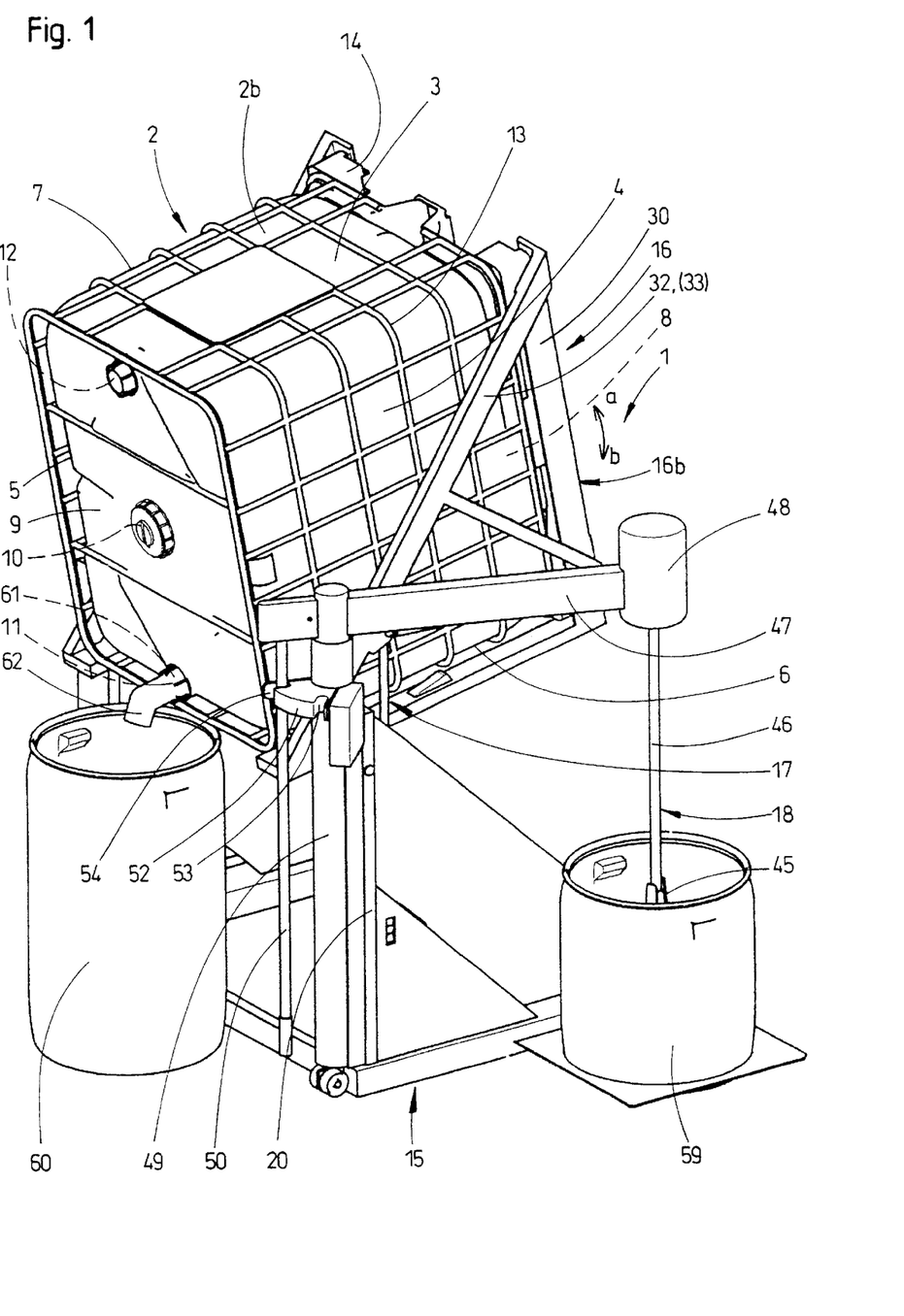
FIG. 1 is a perspective representation of an emptying device according to the invention showing a transport and storage container for liquids pivoted upwardly into the emptying position.

The pivot frame 16 is comprised of a base 30, a front wall 31, and two sidewalls 32, 33 and is open at the rear 29. The pivot frame 16 is pivotably supported on the upper ends 20a, 21a of the two upright supports 20, 21 of the base frame 15.

The pivot drive 17 of the pivot frame 16 is comprised of two cylinder-piston-units 35, 36 connected to a hydraulic pump 34, wherein the cylinder-piston-units 35, 36 are respectively connected in a pivotable manner to a lateral frame part 24, 25 of the bottom frame 19 of the base frame 15 and a sidewall 32, 33 of the pivot frame 16.

The operating lever 37 for the pivot drive 17 of the pivot frame 16 is mounted in a recess of a projecting wall portion 22a of the sidewall 22 of the base frame 15.

The closed front wall 31 of the pivot frame 16 which supports the transport container 2 in the emptying position 2b is comprised of a wall frame 38 and a wall plate 39 secured there at. The open sidewalls 32, 33 of the pivot frame 16 are each formed by a spar 44 extending from the upper end 40a, 41a of the lateral frame parts 40, 41 of the front wall 31 at a slant downwardly to the rearward end 42a, 43a of the lateral frame part 42, 43 of the base 30 of the pivot frame 16.

The stirrer 18 combined with the emptying device 1 has a folding propeller 45 which is suspended from an immersion axle 46 which is driven by a motor 48 connected to a pivot arm 47. The pivot arm 47 is fastened to a rotary support 49 connected to one (20) of the upright supports 20, 21 of the base frame 15. The rotary support 49 is height-adjustable for automatically or manually lifting and lowering the pivot arm 47 together with the folding propeller 45. The folding propeller 45 is manually pivotable via the pivot arm 47 connected to the height-adjustable rotary support 49 from a starting position 45a external to the base frame 15 into a top position above a transport and storage container 2 for liquids positioned on the pivot frame 16 of the emptying device 1 and lowerable through the fill opening 10 of the transport container 2 into the operating position 45b within the container 2 in order to stir the liquid contained in the container before emptying, and can be returned from the operating position 45b into the starting position 45a.

At the short end 47c of the pivot arm 47 of the stirrer 18 a handle bar 54 for manually pivoting the stirrer 18 is provided. The handle bar 54 can be secured in the starting position 47a, 45a and the operating position 47b, 45b of the pivot arm 47 and of the folding propeller 45 suspended therefrom by engaging corresponding catch openings 53, 54 of a catch segment 52 connected to the stationary outer mantle 51 of the rotary support 49 of the stirrer 18.

The handle bar 50 is connected by tension springs (not shown) with the folding propeller 45 of the stirrer 18 for opening and closing the propeller vanes 55, 56.

Figure 6:
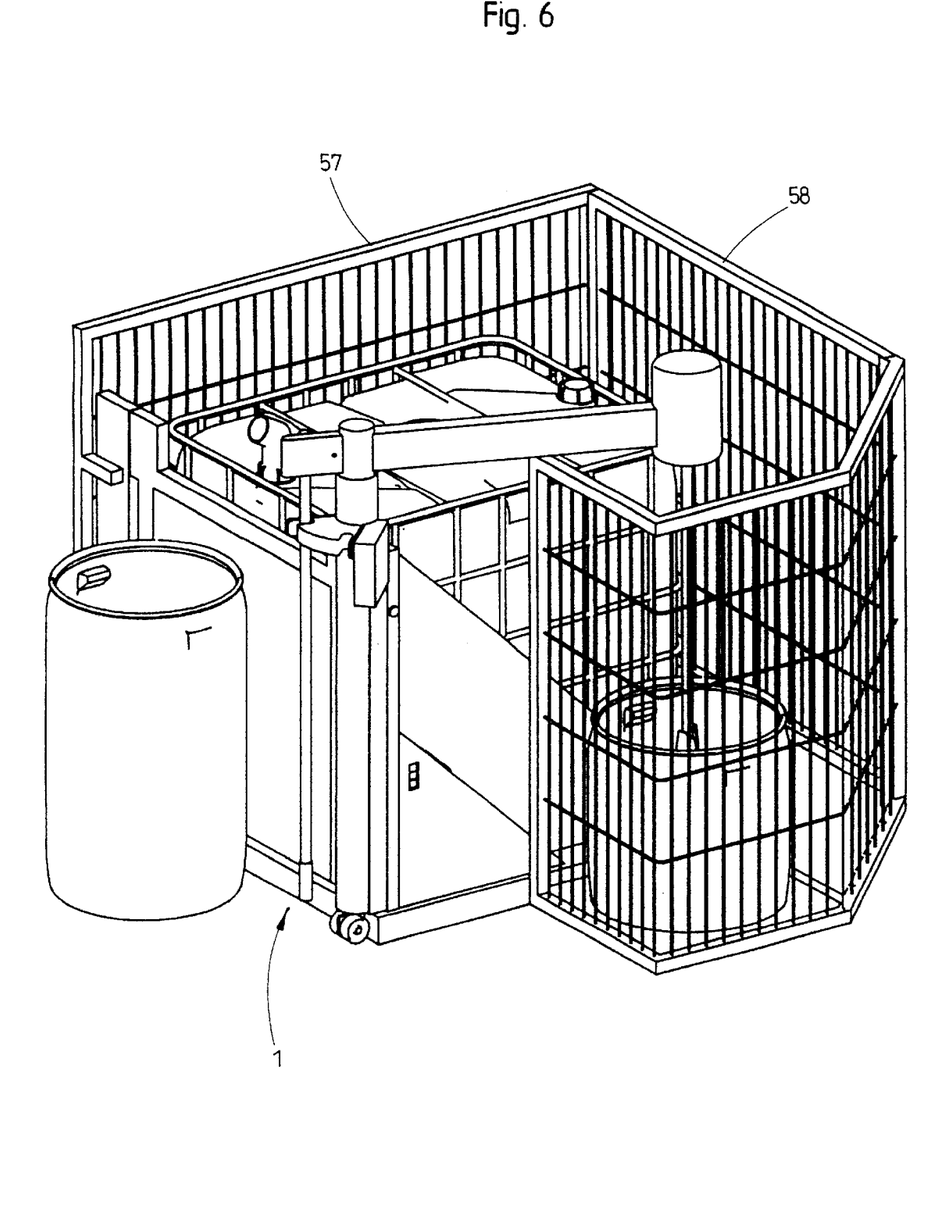
FIG. 6 is a perspective representation of the emptying device according to the invention surrounded by a protective fence.
Figure 7:
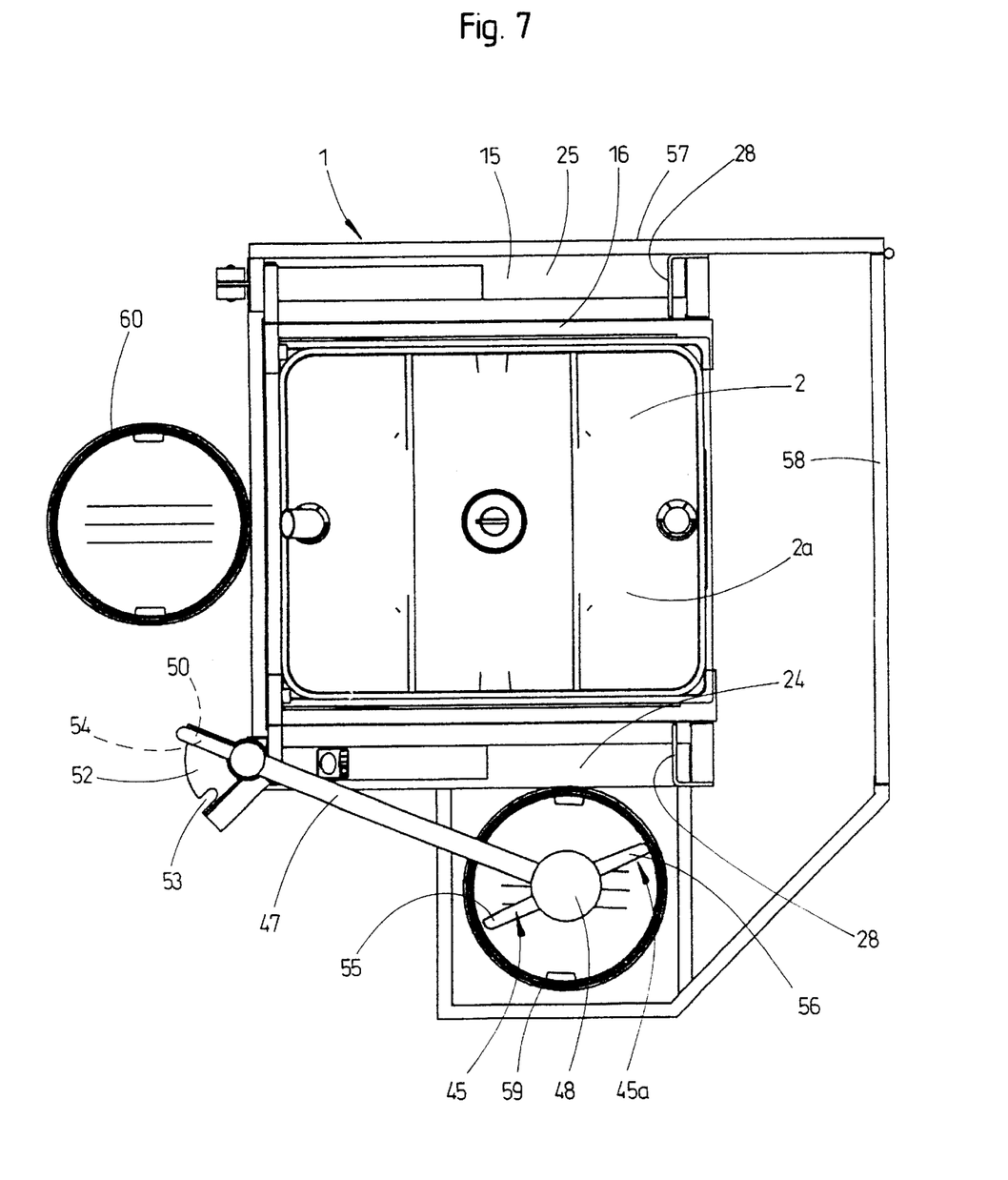
FIG. 7 is a plan view of the emptying device according to the invention with protective fence.

For safety reasons, the emptying device 1 can be fenced in by a protective mesh fence 57 which has at the backside of the emptying device 1 a mesh gate 58. The gate 58 is opened for introducing a transport container 2 into the pivot frame 16 of the emptying device and is closed during the emptying process. The mesh gate 58 of the protective fence 57 is integrated into a control circuit of the pivot drive 17 of the pivot frame 16 for the transport container 2 as a control member such that switching on (actuating) the pivot drive 17 is possible only when the mesh gate 58 is closed.

In the starting position 45a the folding propeller 45 of the stirrer 18 is usually immersed in a container 59 with cleaning liquid. For the purpose of stirring a liquid in the transport container, that has been placed into the pivot frame 16 of the emptying device 1 by means of a forklift, before emptying the container 2, the folding propeller 45 suspended from the pivot arm 47 is lifted out of the container 59 by means of the height-adjustable rotary support 49, pivoted by means of the pivot arm 47 into a position above the transport container 2, inserted through the fill opening 10 thereof into the liquid to be stirred in its operating position 45b, and pivoted back into the starting position 45a after completion of the stirring process.

For filling liquid contained in a transport container 2 with a contents of, for example, 1000 liters, into barrels 60 having a volume of, for example, 80 liters, the transport container 2 is initially pivoted upward from the receiving position 2a by a pivot angle of approximately 100° in the direction of arrow a into the emptying position 2b. In this emptying position 2b the liquid flows from the transport container 2 through the spout 62 threaded onto a threaded collar 61 of the discharge opening 11 of the container 2 into the barrel 60 positioned underneath. As soon as the barrel 60 is filled, the transport container 2 is pivoted from the emptying position 2b in the direction of arrow b to such an extent in the downward direction that liquid can no longer flow out. After transporting the filled barrel away and providing a new barrel to be filled, the filling process is performed again as described above.

When using a discharge fitting to be threaded onto the threaded collar 61 of the discharge opening 11 of a transport container 2, the discharge fitting is closed after filling a barrel 60 and is opened again for filling the next barrel so that the transport container 2 can stay in the upwardly pivoted emptying position 2b when several barrels are filled.

While specific embodiments of the invention have been shown and described in detail to illustrate the inventive principles, it will be understood that the invention may be embodied otherwise without departing from such principles.

What is claimed is:

1. A device for emptying a storage and transport container for liquids, wherein the storage and transport container comprises an inner container made of plastic material, an outer container made of sheet metal or a mesh and surrounding the inner container, and a support frame on which the inner container and the outer container are positioned, wherein the inner container is comprised of four sidewalls, a bottom wall and a top wall, wherein the top wall has a closeable fill opening and a closeable discharge opening the device comprising:

a base frame;

a pivot frame pivotably connected to the base frame;

a pivot drive connected to the pivot frame;

the pivot frame having an initial low position and an upper pivot end position, wherein the pivot drive is configured to pivot the pivot frame from the initial low position into the upper pivot end position and from the upper pivot end position into the initial low position;

wherein the pivot frame is configured to receive the storage and transport container in the initial low position and to secure the storage and transport container in the upper pivot end position;

wherein the upper pivot end position is an emptying position of the storage and transport container received on the pivot frame, wherein:

the base frame has a bottom frame with a forward frame end and a rearward frame end and lateral frame parts connecting the forward end and the rearward end, two forward upright supports connected to the forward end of the bottom frame, two sidewalls connected to the forward supports and the lateral frame parts of the bottom frame;

the pivot frame is pivotably connected to upper ends of the two forward upright supports;

the pivot frame has a base, a front wall, and two sidewalls and is open at a side opposite the front wall;

the pivot drive is comprised of a hydraulic pump and two cylinder-piston-units connected to the hydraulic pump;

each of the two cylinder-piston-units is connected pivotably to the bottom frame and one of the sidewalls of the pivot frame, further comprising a stirrer connected to the base frame, wherein:

the stirrer comprises a motor, an immersion axle driven by the motor, and a folding propeller connected to an end of the immersion axle remote from the motor;

the base frame has a rotary support connected to one of the two forward upright supports of the base frame;

the rotary support has a pivot arm and the motor is connected to the pivot arm;

the rotary support is configured to be height-adjustable automatically or manually in order to adjust a position of the pivot arm;

the folding propeller is configured to be moved automatically or manually via the pivot arm from a starting position external to the base frame into a top position above the storage and transport container received in the pivot frame and from the top position into an operating position inside the storage and transport container by passing through the fill opening of the storage and transport container and to be returned from the operating position into the starting position.

2. The device according to claim 1, wherein the lateral frame parts are hollow profiled members configured to receive gripping arms of a fork lift.

3. The device according to claim 1, wherein the forward frame end of the bottom frame has running wheels and wherein the rearward frame end of the bottom frame has handles so that the device is moveable by lifting the rearward end and pushing or pulling the device on the running wheels.

4. The device according to claim 1, wherein the two sidewalls of the base frame are formed as slanted lateral webs.

5. The device according to claim 1, wherein the pivot drive comprises an operating lever and wherein the operating lever is positioned in a recess of a projecting portion of one of the two sidewalls of the base frame.

6. The device according to claim 1, wherein the front wall of the pivot frame is configured to secure the storage and transport container in the upper pivot end position, wherein the front wall is closed and the two sidewalls of the pivot frame are open.

7. The device according to claim 6, wherein:

the front wall of the pivot frame is comprised of a wall frame, having lateral frame parts, and a wall plate secured in the wall frame;

each of the two sidewalls of the pivot frame is a spar connected to an upper end of one of the lateral frame parts of the wall frame and extending downwardly at a slant to a rearward end of the base of the pivot frame.

8. The device according to claim 1, wherein:

the pivot arm has a short end projecting past the rotary support in a direction away from the motor;

the short end has a handle bar configured to manually move the pivot arm;

the rotary support has an external catch segment with catch openings;

the handle bar is secured in the starting position and the operating position of the folding propeller in the catch openings of the external catch segment.

9. The device according to claim 1, further comprising a protective fence surrounding the device.

10. The device according to claim 9, wherein the protective fence has a gate at a backside of the device.

11. The device according to claim 10, wherein the gate is integrated as a control member into a control circuit of the pivot drive such that an actuation of the pivot drive is possible only when the gate is closed.

* * * * *